(12) United States Patent
Lin

(10) Patent No.: US 8,366,267 B2
(45) Date of Patent: Feb. 5, 2013

(54) SPECTACLE STRUCTURE

(75) Inventor: Kuo-Tseng Lin, Taipei (TW)

(73) Assignee: T-Link PPE Ltd., Taipei (TW)

( * ) Notice: Subject to any disclaimer, the term of this patent is extended or adjusted under 35 U.S.C. 154(b) by 214 days.

(21) Appl. No.: 12/984,001

(22) Filed: Jan. 4, 2011

(65) Prior Publication Data
US 2012/0169989 A1    Jul. 5, 2012

(51) Int. Cl.
*G02C 11/08* (2006.01)
(52) U.S. Cl. .......................................... 351/62; 351/153
(58) Field of Classification Search .................... 351/44, 351/62, 119–121, 153
See application file for complete search history.

(56) References Cited

U.S. PATENT DOCUMENTS

| 7,059,717 | B2 * | 6/2006 | Bloch | 351/119 |
| 7,322,692 | B2 * | 1/2008 | Winningham | 351/156 |
| 2007/0277297 | A1 * | 12/2007 | Chiang | 2/426 |

* cited by examiner

*Primary Examiner* — Scott J Sugarman
*Assistant Examiner* — Vipin Patel
(74) *Attorney, Agent, or Firm* — WPAT, P.C.; Anthony King

(57) ABSTRACT

A spectacle structure includes an inner frame unit having two connected horizontal U-shaped frame members respectively formed from an upper, a laterally outer and a lower frame section, the upper frame sections being connected to each other, each of the outer frame sections being provided with two horizontal grooves and a post or a recess or a through hole located between the two grooves, and each of the lower frame sections having a forward and inward extended support section; a lens unit having two connected lenses, each of which being provided with two horizontal ribs and a recess or a through hole or a post corresponding to the outer frame section, allowing the inner frame unit to be firmly assembled to and conveniently disassembled from a rear side of the lens unit; and a wear unit being pivotally connected to two opposite ends of the lens unit.

16 Claims, 9 Drawing Sheets

SPECTACLE STRUCTURE

FIELD OF THE INVENTION

The present invention relates to a spectacle structure, and more particularly to a spectacle structure including an inner frame unit that can be firmly assembled to and conveniently disassembled from a rear side of a lens unit.

BACKGROUND OF THE INVENTION

A conventional spectacle structure, such as a pair of general optical eyeglasses, usually includes a lens frame, two lenses, and two temples. The lens frame includes two frame members for receiving the two lenses therein, such that the two lenses are separately fitted into the two frame members. The two temples are separately pivotally connected to two laterally outer frame sections of the two frame members. When it is desired to add a soft pad or a wind guard to a rear side of the lens frame for the pair of eyeglasses to be more comfortable for wearing or to prevent crosswind from directly blowing into a user's eyes, an adhesive structure, a clip-on structure, or a magnetic structure is usually used to connect the soft pad or the wind guard to the rear side of the lens frame. However, either the adhesive structure or the clip-on structure or the magnetic structure is an external structure that not only increases the whole structural complexity and accordingly, the manufacturing cost of the eyeglasses, but also is inconvenient for use. For example, for the soft pad or wind guard to be firmly attached to the rear side of the lens frame of the eyeglasses, the above-mentioned adhesive, clip-on, or magnetic structure would usually have to possess relatively high adhesion, clipping force, or magnetic attraction force. The high adhesion, clipping force, or magnetic attraction force would prevent a user from conveniently detaching the soft pad or the wind guard from the lens frame.

Therefore, it is desirable to develop a spectacle structure having an inner frame unit and a lens unit that can be firmly assembled to and conveniently disassembled from each other.

SUMMARY OF THE INVENTION

A primary object of the present invention is to provide a spectacle structure including an inner frame unit, a lens unit and a wear unit; and the inner frame unit can be firmly assembled to and conveniently disassembled from a rear side of the lens unit without the need of tightening or loosening any screws or other conventional fastening elements.

To achieve the above and other objects, the spectacle structure according to a first embodiment of the present invention includes an inner frame unit, a lens unit, and a wear unit. The inner frame unit has two connected frame members, each of which being a horizontal U-shaped member formed from three sequentially connected frame sections, namely, an upper frame section, a laterally outer frame section, and a lower frame section. The upper frame sections are connected to each other. Each of the two outer frame sections is provided on a laterally outer side with at least one laterally projected post and at least one groove horizontally extended across the outer frame section. And, each of the two lower frame sections has a support section forward and inward extended from a bottom edge thereof. The lens unit includes two connected lenses, each of which being provided on a laterally inner side facing toward the outer frame section with at least one recess or through hole and at least one horizontally extended rib. The horizontal rib is rearward projected beyond the lens and is correspondingly received in and engaged with the horizontal groove formed on the outer frame section, and the laterally projected post on the outer frame section is correspondingly received in the recess or through hole formed on the lens. And, each of the lenses has a bottom edge rest on the support section of the lower frame section. The wear unit is pivotally connected to two opposite ends of the lens unit.

To achieve the above and other objects, the spectacle structure according to a second embodiment of the present invention includes an inner frame unit, a lens unit, and a wear unit. The inner frame unit has two connected frame members, each of which being a horizontal U-shaped member formed from three sequentially connected frame sections, namely, an upper frame section, a laterally outer frame section, and a lower frame section. The upper frame sections are connected to each other. Each of the two outer frame sections is provided on a laterally outer side with at least one recess or through hole and at least one groove horizontally extended across the outer frame section. And, each of the two lower frame sections has a support section forward and inward extended from a bottom edge thereof. The lens unit includes two connected lenses, each of which being provided on a laterally inner side facing toward the outer frame section with at least one laterally projected post and at least one horizontally extended rib. The horizontal rib is rearward projected beyond the lens and is correspondingly received in and engaged with the horizontal groove formed on the outer frame section, and the laterally projected post on the lens unit is correspondingly received in the recess or through hole formed on the outer frame section. And, each of the lenses has a bottom edge rest on the support section of the lower frame section. The wear unit is pivotally connected to two opposite ends of the lens unit.

With the above arrangements, the inner frame unit of the spectacle structure of the present invention can be firmly assembled to or conveniently disassembled from the rear side of the lens unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
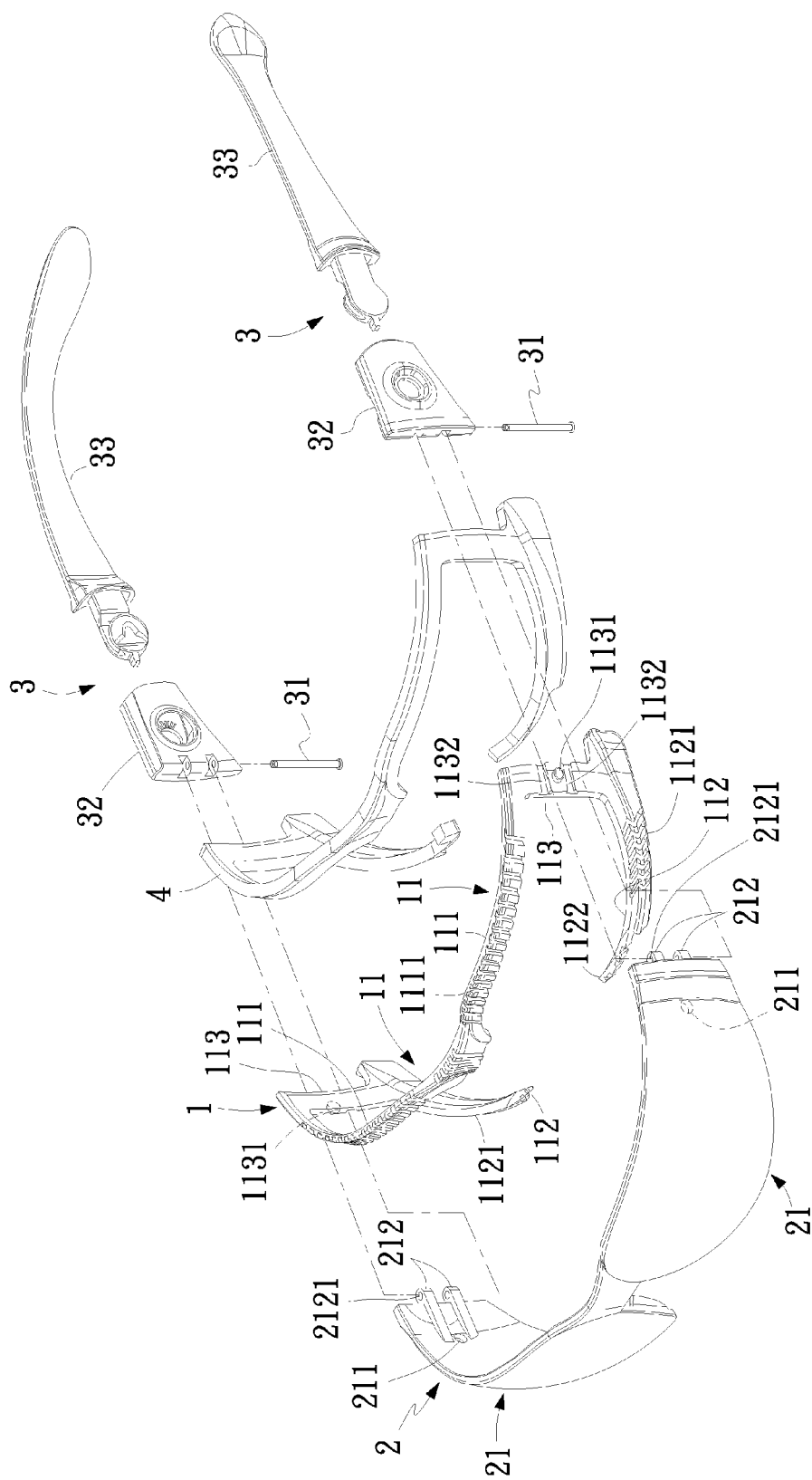
FIG. 1 is an exploded perspective view showing a spectacle structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
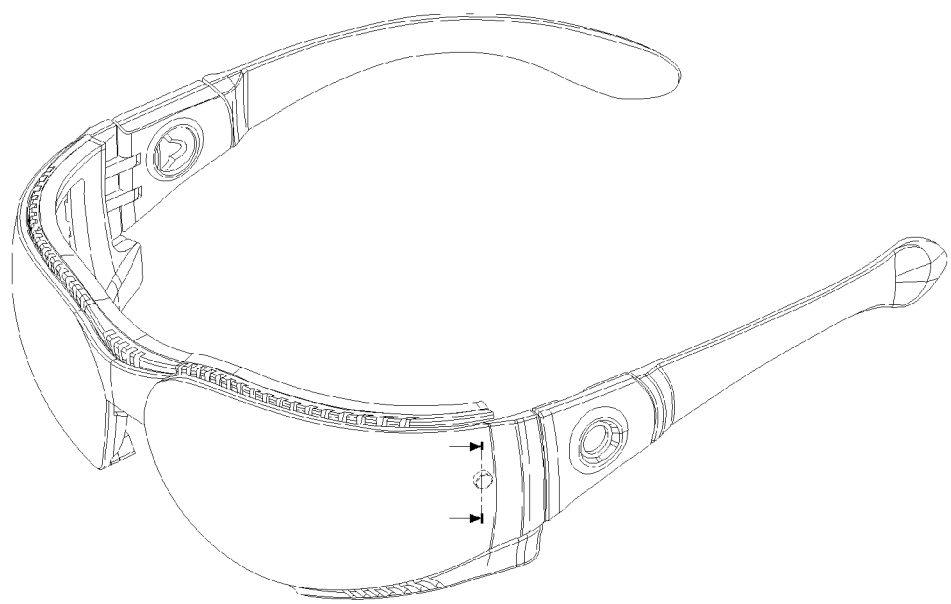
FIG. 2 is an assembled view of FIG. 1.
Figure 3:
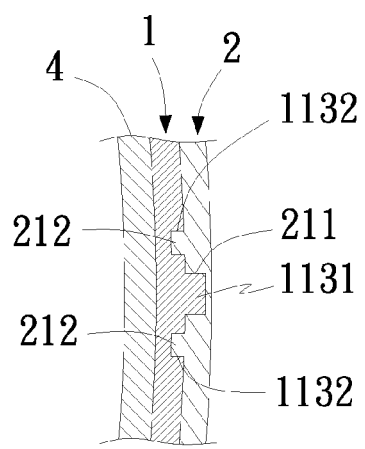
FIG. 3 is a fragmentary sectional view of the spectacle structure of FIG. 2.
Figure 4:
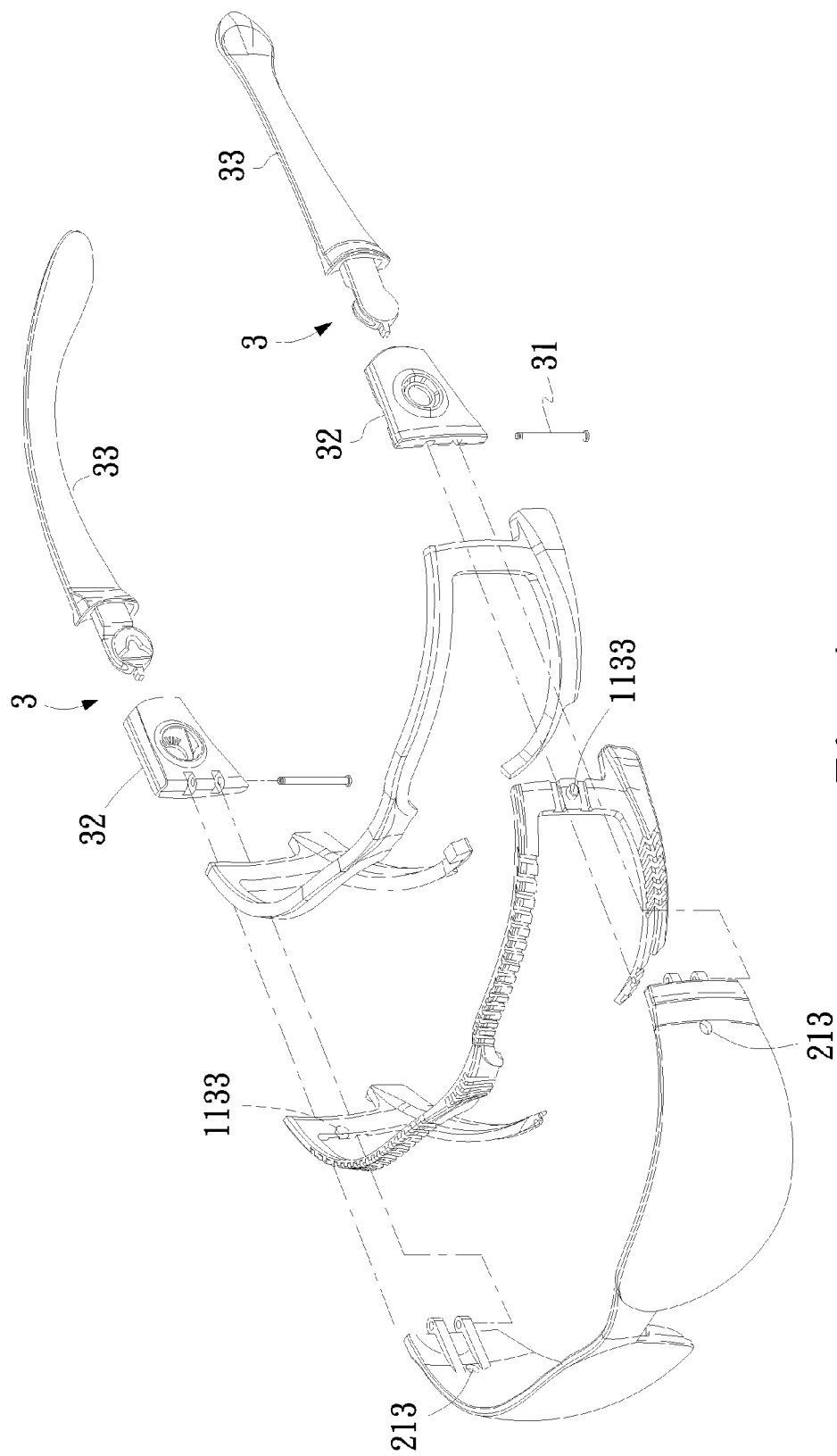
FIG. 4 is an exploded perspective view showing a variant of the spectacle structure according to the first embodiment of the present invention.
Figure 5:
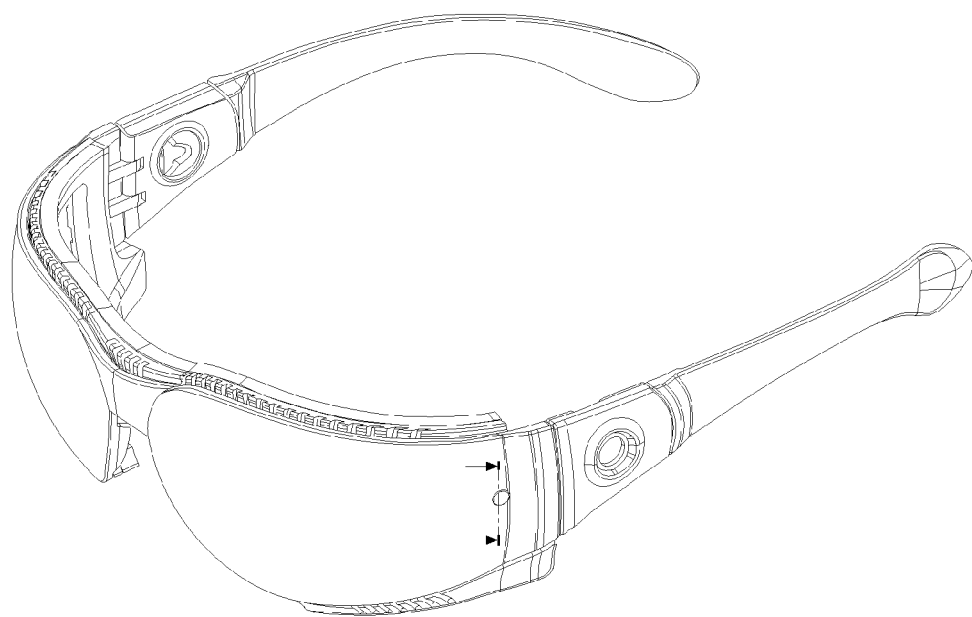
FIG. 5 is an assembled view of FIG. 4.
Figure 6:
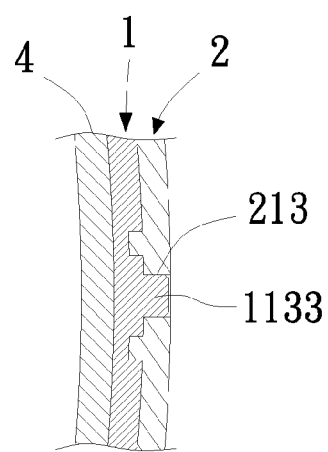
FIG. 6 is a fragmentary sectional view of the spectacle structure of FIG. 5.

FIGS. 1 and 2 are exploded and assembled perspective views, respectively, of a spectacle structure according to a first embodiment of the present invention; and FIG. 3 is a fragmentary sectional view of the spectacle structure of FIG. 2. As shown, the spectacle structure according to the first embodiment of the present invention includes an inner frame unit 1, a lens unit 2, and a wear unit 3. The inner frame unit 1 includes two connected frame members 11. Each of the frame members 11 is a horizontal U-shaped member formed from three sequentially connected frame sections, namely, an upper frame section 111, a laterally outer frame section 113, and a lower frame section 112. The upper frame sections 111 are connected to each other. Each of the two outer frame sections 113 is provided on a laterally outer side with at least one laterally projected post 1131 and at least one groove 1132 horizontally extended across the outer frame section 113. Each of the two lower frame sections 112 has a support section 1121 forward and inward extended from a bottom edge thereof. The inner frame unit 1 designed to prevent crosswind from directly blowing into a user's eyes and bringing discomfort to the user. Alternatively, each of the two frame members 11 can further include a laterally inner frame section (not shown) for connecting the upper frame section 111 with the lower frame section 112, so as to form a closed frame member 11 instead of the horizontal U-shaped frame member. The lens unit 2 includes two connected lenses 21. Each of the lenses 21 is provided on a laterally inner side facing toward the outer frame section 113 with at least one recess 211 and at least one horizontally extended rib 212. The horizontal rib 212 is rearward projected beyond the lens 21 and is correspondingly received in and engaged with the horizontal groove 1132 formed on the outer frame section 113; and the laterally projected post 1131 on the outer frame section 113 is correspondingly received in the recess 211 formed on the lens 21. In a variant of the spectacle structure according to the first embodiment of the present invention as shown in FIGS. 4, 5 and 6, each of the lenses 21 is provided with a through hole 213 to replace the recess 211, and each of the outer frame sections 113 is provided with a laterally projected post 1133 to replace the post 1131 for extending into the through hole 213. Each of the lenses 21 has a bottom edge rest on the support section 1121. In the illustrated first embodiment of the present invention, the lens unit 2 is a rimless lens unit and is therefore light in weight for a user to comfortably wear the spectacle structure. Further, since the rimless lens unit 2 is not shielded by any thing along its outer periphery, the user can have widened field of view via the rimless lens unit 2. The lens unit 2 can include colored lenses 21 to avoid strong sunshine hazard on eyes. The wear unit 3 is pivotally connected to two opposite ends of the lens unit 2, and includes two sets of connecting element 32 and temple 33. Each of the connecting elements 32 is pivotally connected at an end to one of the two opposite ends of the lens unit 2 and connected at another opposite end to an end of a corresponding one of the two temples 33.

Through engagement of the ribs 212 with the grooves 1132, it is able to guide and preliminarily assemble the inner frame unit 1 to a rear side of the lens unit 2. Then, through engagement of the posts 1131 with the recesses 211 or the posts 1133 with the through holes 213, it is able to fully assemble the inner frame unit 1 to the rear side of the lens unit 2. The number of the posts 1131 and the recesses 211, or the number of the posts 1133 and the through holes 213 can be correspondingly increased to provide increased connecting strength between the inner frame unit 1 and the lens unit 2. Further, since both the inner frame unit 1 and the lens unit 2 are curved in shape, and the posts 1131 and the recesses 211, or the posts 1133 and the through holes 213, are respectively provided at two opposite ends of the inner frame unit 1 and the lens unit 2, an expanding elasticity of the inner frame unit 1 and a compressing elasticity of the lens unit 2 allow the posts 1131 and the recesses 211 or the posts 1133 and the through holes 213 to be easily engaged with one another to thereby restrain the inner frame unit 1 and the lens unit 2 from moving forward or rearward relative to each other. And, with the engagement of the ribs 212 with the grooves 1132, as well as the positioning of upper and lower edges of the lens unit 2 in between the upper frame sections 111, the lower frame sections 112 and the support sections 1121, the lens unit 2 is prevented from turning upward and downward relative to the inner frame unit 1. That is, the inner frame unit 1 can be conveniently and firmly assembled to the rear side of the lens unit 2. When it is desired to disassemble the inner frame unit 1 from the lens unit 2 for the purpose of, for example, replacing the inner frame unit 1 with another one, the user needs only to apply an outward force at each of two opposite ends of the lens unit 2 to slightly expand the same, or to apply an inward force at each of two opposite ends of the inner frame unit 1 to slightly compress the same. At this point, the posts 1131 and the recesses 211 or the posts 1133 and the through holes 213 can be easily disengaged from one another. Then, the inner frame unit 1 can be moved rearward to conveniently disassemble from the lens unit 2.

In the variant of the first embodiment of the present invention as shown in FIGS. 4 to 6, the posts 1133 may respectively have a slightly rearward bent top to look like a hook, so as to enable increased connecting strength between the inner frame unit 1 and the lens unit 2.

Figure 7:
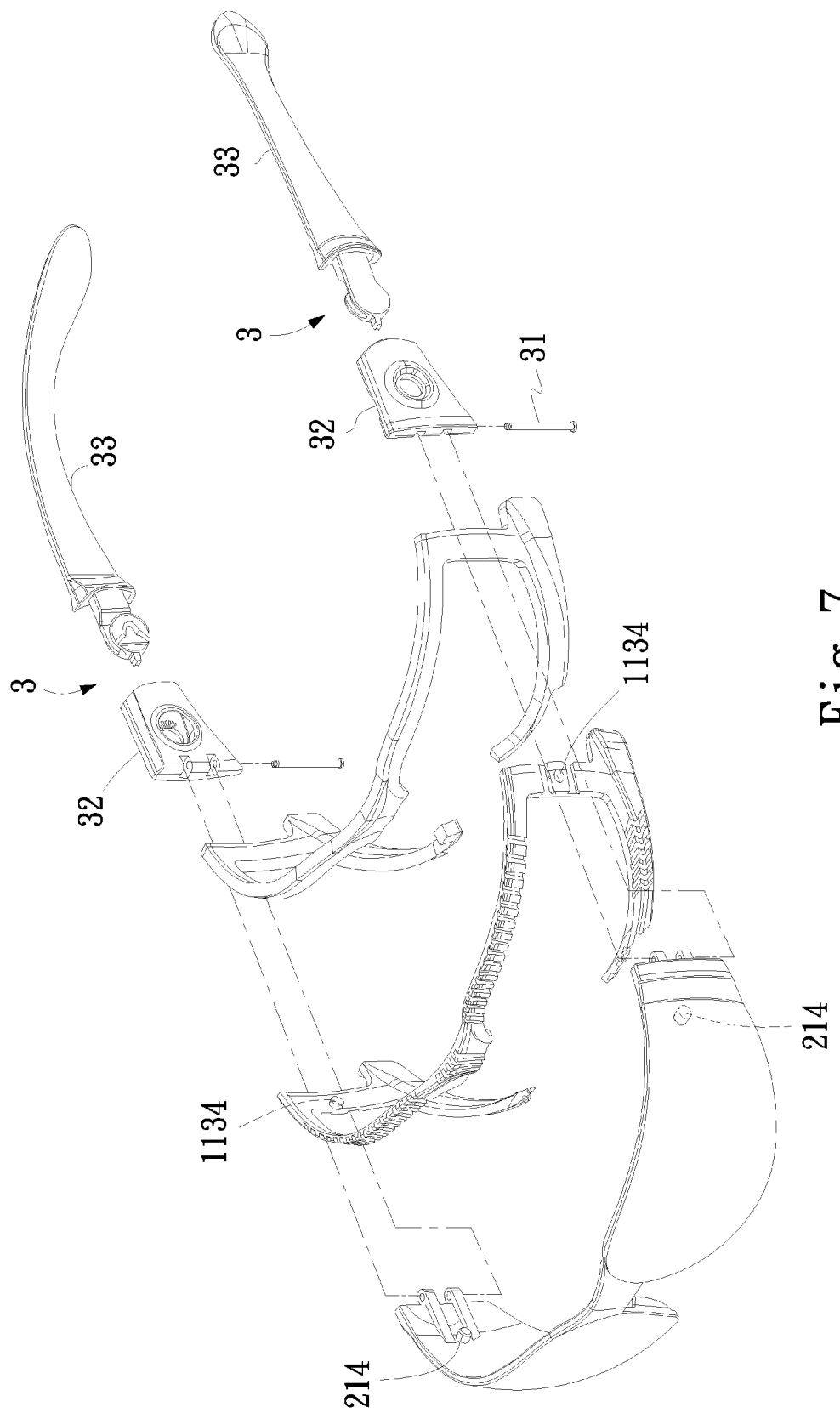
FIG. 7 is an exploded perspective view showing a spectacle structure according to a second embodiment of the present invention.
Figure 8:
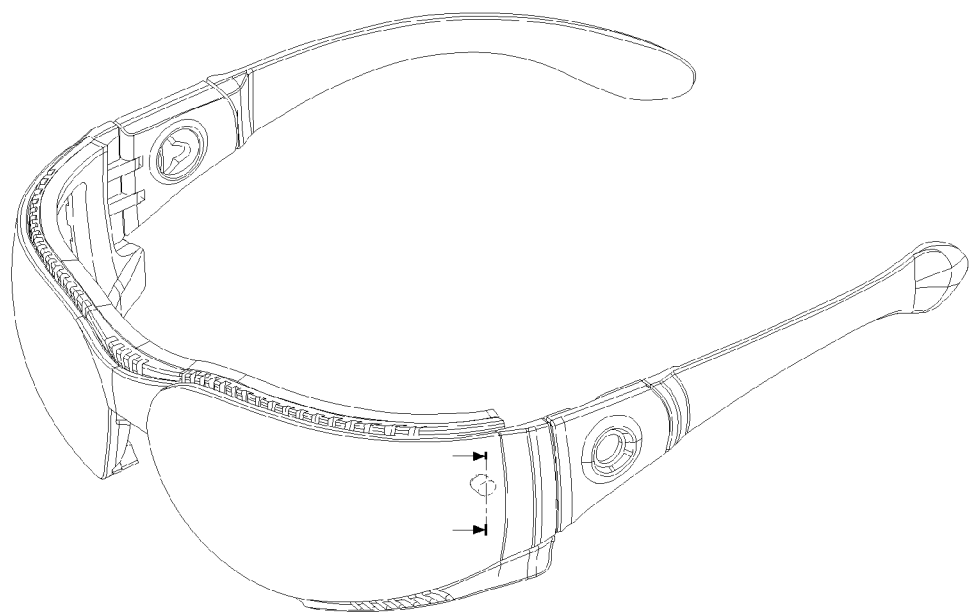
FIG. 8 is an assembled view of FIG. 7.
Figure 9:
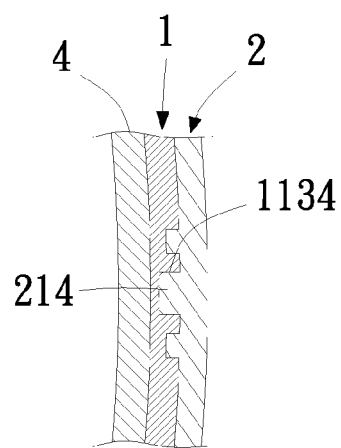
FIG. 9 is a fragmentary sectional view of the spectacle structure of FIG. 8.
Figure 10:
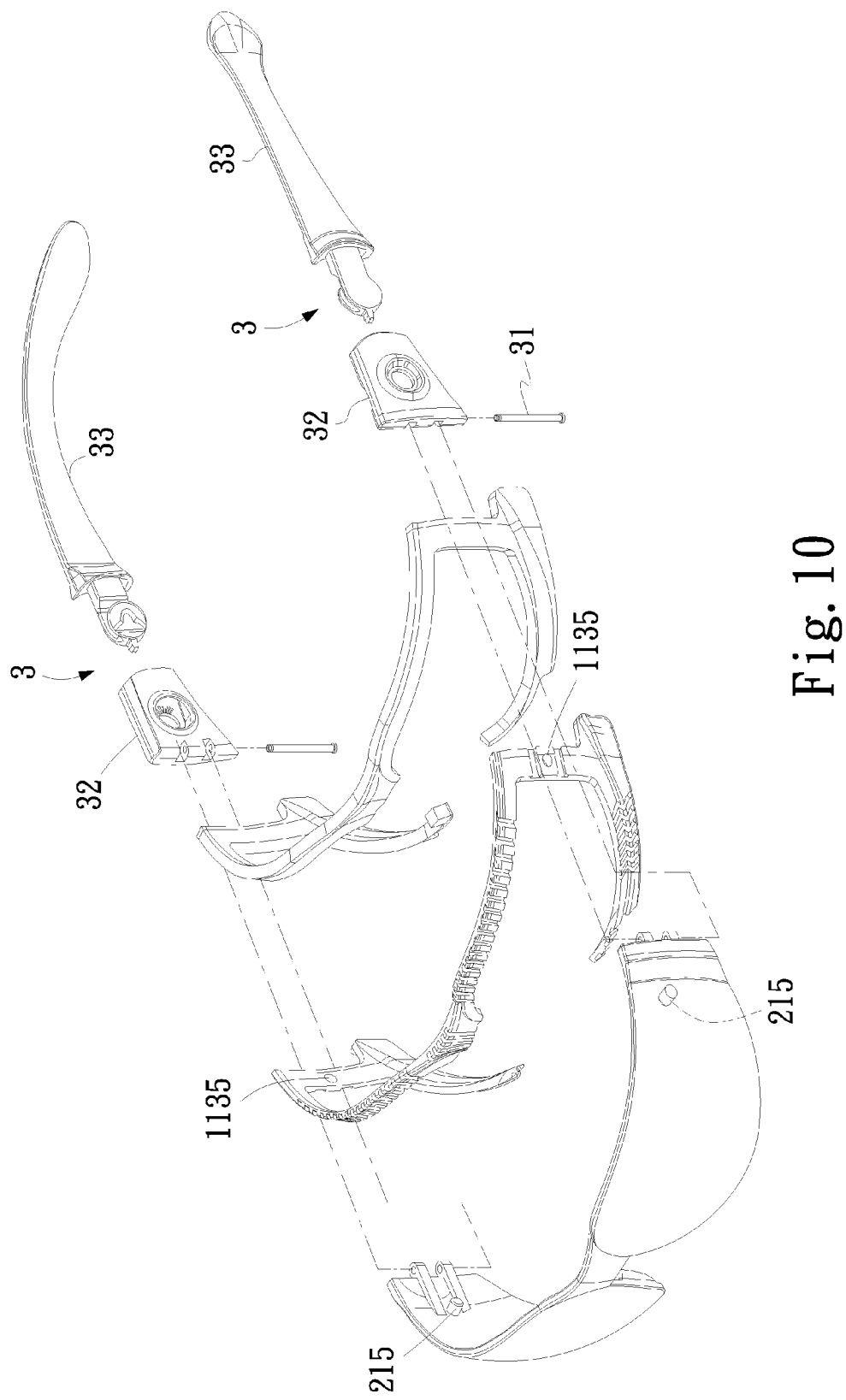
FIG. 10 is an exploded perspective view showing a variant of the spectacle structure according to the second embodiment of the present invention.
Figure 11:
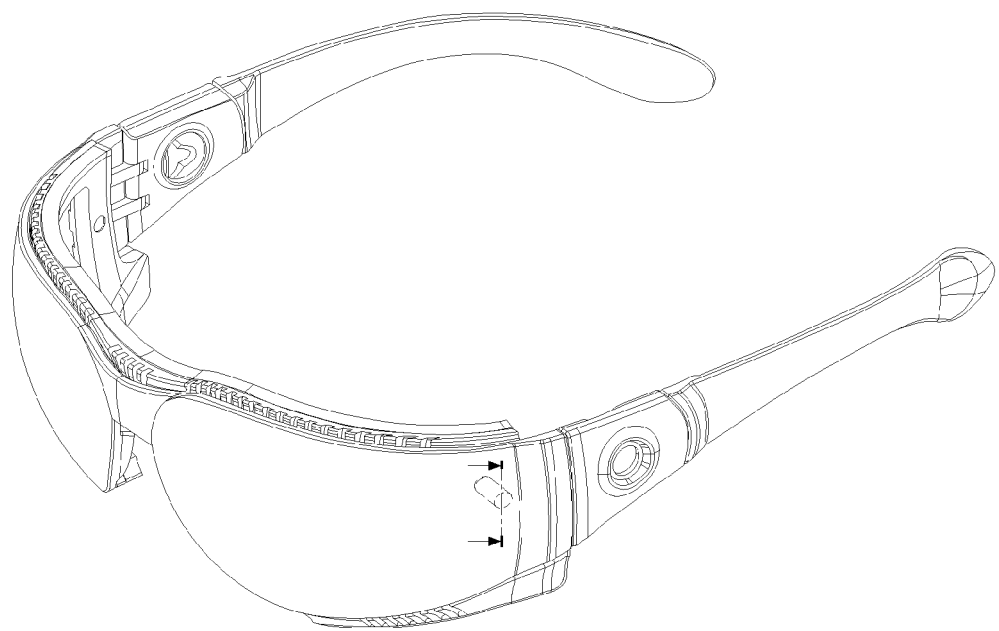
FIG. 11 is an assembled view of FIG. 10.
Figure 12:
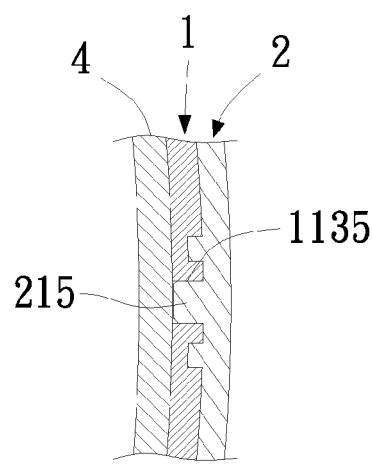
FIG. 12 is a fragmentary sectional view of the spectacle structure of FIG. 11.

FIGS. 7 and 8 are exploded and assembled perspective views, respectively, of a spectacle structure according to a second embodiment of the present invention; and FIG. 9 is a fragmentary sectional view of the spectacle structure of FIG. 8. As shown, the spectacle structure according to the second embodiment of the present invention includes an inner frame unit 1, a lens unit 2, and a wear unit 3. The inner frame unit 1 includes two connected frame members 11. Each of the frame members 11 is a horizontal U-shaped member formed from three sequentially connected frame sections, namely, an upper frame section 111, a laterally outer frame section 113, and a lower frame section 112. The upper frame sections 111 are connected to each other. Each of the two outer frame sections 113 is provided on a laterally outer side with at least one recess 1134 and at least one groove 1132 horizontally extended across the outer frame section 113. Each of the two lower frame sections 112 has a support section 1121 forward and inward extended from a bottom edge thereof. The inner frame unit 1 is designed to prevent crosswind from directly blowing into a user's eyes and bringing discomfort to the user. Alternatively, each of the two frame members 11 can further include a laterally inner frame section (not shown) for connecting the upper frame section 111 with the lower frame section 112, so as to form a closed frame member 11 instead of the horizontal U-shaped frame member. The lens unit 2 includes two connected lenses 21. Each of the lenses 21 is provided on a laterally inner side facing toward the outer frame section 113 with at least one laterally inward projected post 214 and at least one horizontally extended rib 212. The horizontal rib 212 is rearward projected beyond the lens 21 and is correspondingly received in and engaged with the horizontal groove 1132 formed on the outer frame section 113; and the laterally projected post 214 on the lens 21 is correspondingly received in the recess 1134 formed on the outer frame section 113. In a variant of the spectacle structure according to the second embodiment of the present invention as shown in FIGS. 10, 11 and 12, each of the outer frame sections 113 is provided with a through hole 1135 to replace the recess 1134, and each of the lenses 21 is provided with a laterally projected post 215 to replace the post 214 for extending into the through hole 1135. Each of the lenses 21 has a bottom edge rest on the support section 1121. In the illustrated second embodiment of the present invention, the lens unit 2 is a rimless lens unit and is therefore light in weight for the user to comfortably wear the spectacle structure. Further, since the rimless lens unit 2 is not shielded by any thing along its outer periphery, the user can have widened field of view via the rimless lens unit 2. The lens unit 2 can include colored lenses 21 to avoid strong sunshine hazard on eyes. The wear unit 3 is pivotally connected to two opposite ends of the lens unit 2, and includes two sets of connecting element 32 and temple 33. Each of the connecting elements 32 is pivotally connected at an end to one of the two opposite ends of the lens unit 2 and connected at another opposite end to an end of a corresponding one of the temples 33.

Through engagement of the ribs 212 with the grooves 1132, it is able to guide and preliminarily assemble the inner frame unit 1 to a rear side of the lens unit 2. Then, through engagement of the posts 214 with the recesses 1134 or the posts 215 with the through holes 1135, it is able to fully assemble the inner frame unit 1 to the rear side of the lens unit 2. The number of the posts 214 and the recesses 1134, or the number of the posts 215 and the through holes 1135 can be correspondingly increased to provide increased connecting strength between the inner frame unit 1 and the lens unit 2. Further, since both the inner frame unit 1 and the lens unit 2 are curved in shape, and the posts 214 and the recesses 1134, or the posts 215 and the through holes 1135, are respectively provided at two opposite ends of the inner frame unit 1 and the lens unit 2, an expanding elasticity of the inner frame unit 1 and a compressing elasticity of the lens unit 2 allow the posts 214 and the recesses 1134 or the posts 215 and the through holes 1135 to be easily engaged with one another to thereby restrain the inner frame unit 1 and the lens unit 2 from moving forward or rearward relative to each other. And, with the engagement of the ribs 212 with the grooves 1132, as well as the positioning of upper and lower edges of the lens unit 2 in between the upper frame sections 111, the lower frame sections 112 and the support sections 1121, the lens unit 2 is prevented from turning upward and downward relative to the inner frame unit 1. That is, the inner frame unit 1 can be conveniently and firmly assembled to the rear side of the lens unit 2. When it is desired to disassemble the inner frame unit 1 from the lens unit 2 for the purpose of, for example, replacing the inner frame unit 1 with another one, the user needs only to apply an outward force at each of two opposite ends of the lens unit 2 to slightly expand the same, or to apply an inward force at each of two opposite ends of the inner frame unit 1 to slightly compress the same. At this point, the posts 214 and the recesses 1134 or the posts 215 and the through holes 1135 can be easily disengaged from one another. Then, the inner frame unit 1 can be moved rearward to conveniently disassemble from the lens unit 2.

In the illustrated first embodiment, there are two parallelly spaced grooves 1132 provided on and extended across the laterally outer side of each of the two outer frame sections 113, and the post 1131, 1133 is located between the two grooves 1132. Meanwhile, there are two parallelly spaced horizontal ribs 212 provided on the laterally inner side of each of the two lenses 21 facing toward the outer frame section 113. The two ribs 212 are separately received in the two grooves 1132 to enable enhanced guiding and restraining functions.

In the illustrated second embodiment, there are two parallelly spaced grooves 1132 provided on and extended across the laterally outer side of each of the two outer frame sections 113, and the recess 1134, 1135 is located between the two grooves 1132. Meanwhile, there are two parallelly spaced horizontal ribs 212 provided on the laterally inner side of each of the two lenses 21 facing toward the outer frame section 113. The two ribs 212 are separately received in the two grooves 1132 to enable enhanced guiding and restraining functions.

In both of the first and the second embodiment, the wear unit 3 is pivotally connected to between the two ribs 212 at each of two ends of the lens unit 2 to provide increased connecting strength between the wear unit 3 and the lens unit 2. Each of the ribs 212 is provided at a rear end with a pivot hole 2121. The wear unit 3 further includes two fixing elements for separately extending through one end of the two connecting elements 32 of the wear unit 3 and the pivot holes 2121 on the ribs 212 at two ends of the lens unit 2, so that the wear unit 3 is pivotally connected to the lens unit 2. The fixing elements 31 can be two pivot pins or two screws.

In both of the first and the second embodiment, the upper frame sections 111 and the lower frame sections 112 are respectively provided at predetermined positions with a plurality of venting slots 1111, 1122 extended from an inner side to an outer side of the upper and lower frame sections. Via the venting slots 1111, 1122, external fresh air is guided into a space behind the lens unit 2, and hot air or moisture in the space behind the lens unit 2 is guided out to external environment.

The spectacle structure according to the first and the second embodiment of the present invention may further include a soft protective pad 4 attached to a rear side of the inner frame unit 1. When the user wears the spectacle structure of the present invention, the soft protective pad 4 is in contact with the user's nose bridge to thereby protect the user's face against injury caused by the impact of an external force applied to the spectacle structure.

Figure 13:
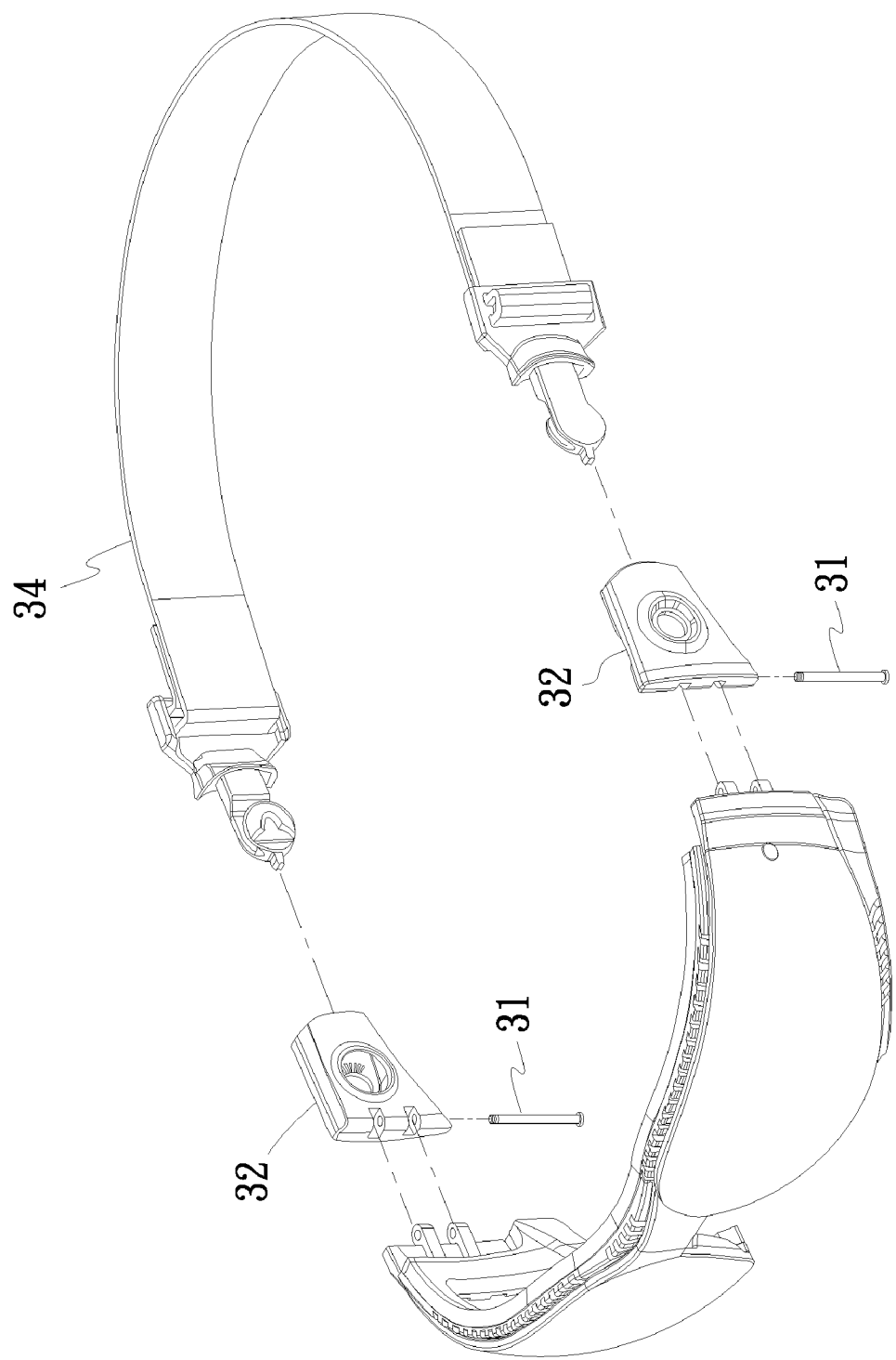
FIG. 13 is an exploded perspective view showing a spectacle structure according to a third embodiment of the present invention.

FIG. 13 is an exploded perspective view of a spectacle structure according to a third embodiment of the present invention. While the wear unit in the first and the second embodiment includes two sets of connecting element and temple, the wear unit in the third embodiment includes two connecting elements 32 and an elastic head strap 34. The two connecting elements 32 are pivotally connected at one end to two opposite ends of the lens unit 2 and connected at another opposite end to two opposite ends of the head strap 34, so as to satisfy the wearing requirement of different users.

With the above arrangements, the spectacle structure of the present invention is novel and improved because the inner frame unit 1 can be firmly assembled to or conveniently disassembled from the rear side of the lens unit 2 without the need of tightening or loosening any conventional fastening elements, such as screws. The spectacle structure of the present invention is also industrially practical for use because products derived from the present invention would no doubt fully satisfy the current market demands.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A spectacle structure, comprising:
an inner frame unit having two connected frame members;
a lens unit including two connected lenses;
a wear unit being pivotally connected to two opposite ends of the lens unit, each pivotally connected along a vertical axis;
wherein each of the frame members being a U-shaped member formed from three sequentially connected frame sections, namely, an upper frame section horizontal to the vertical axis, a laterally outer frame section, and a lower frame section; the upper frame sections being connected to each other; each of the two outer frame sections being provided on a laterally outer side with one laterally projected post and at least one horizontal groove extended horizontally relative to the vertical axis, and is extended across the outer frame section; and each of the two lower frame sections having a support section forward and inward extended from a bottom edge thereof; and
wherein each of the lenses being provided on a laterally inner side facing toward the outer frame section with at least one recess or through hole and at least one horizontal rib horizontally extended relative to the vertical axis; the horizontal rib being rearward projected beyond the lens and being correspondingly received in and engaged with the horizontal groove formed on the outer frame section; and the laterally projected post on the outer frame section being correspondingly received in the recess or through hole formed on the lens; and each of the lenses respectively having a bottom edge rest on the support section of the lower frame section.

2. The spectacle structure as claimed in claim 1, wherein there are two parallelly spaced grooves provided on and extended across the laterally outer side of each of the two outer frame sections, and the post is located between the two grooves; and wherein there are two parallelly spaced horizontal ribs provided on the laterally inner side of each of the two lenses facing toward the outer frame section; and the two ribs being separately received in the two grooves.

3. The spectacle structure as claimed in claim 2, wherein the wear unit is pivotally connected to between the two ribs.

4. The spectacle structure as claimed in claim 3, wherein the two ribs are respectively provided at a rear end with a pivot hole.

5. The spectacle structure as claimed in claim 1, wherein the upper frame sections and the lower frame sections are respectively provided at predetermined positions with a plurality of venting slots extended from an inner side to an outer side of the upper and lower frame sections.

6. The spectacle structure as claimed in claim 1, further comprising a soft protective pad being attached to a rear side of the inner frame unit.

7. The spectacle structure as claimed in claim 1, wherein the wear unit includes two sets of connecting element and temple; each of the two connecting elements being pivotally connected at an end to one of the two opposite ends of the lens unit and connected at another opposite end to an end of a corresponding one of the two temples.

8. The spectacle structure as claimed in claim 1, wherein the wear unit includes two connecting elements and an elastic head strap; and each of the two connecting elements being pivotally connected at an end to one of two opposite ends of the lens unit and connected at another opposite end to one of two opposite ends of the head strap.

9. A spectacle structure, comprising:
an inner frame unit having two connected frame members;
a lens unit including two connected lenses;
a wear unit being pivotally connected to two opposite ends of the lens unit;
wherein each of the frame members being a U-shaped member formed from three sequentially connected frame sections, namely, an upper frame section horizontal to the vertical axis, a laterally outer frame section, and a lower frame section; the upper frame sections being connected to each other; each of the two outer frame sections being provided on a laterally outer side with at least one recess or through hole and at least one horizontal groove extended horizontally relative to the vertical axis, and is extended across the outer frame section; and each of the two lower frame sections having a support section forward and inward extended from a bottom edge thereof; and
wherein each of the lenses being provided on a laterally inner side facing toward the outer frame section with at least one laterally inward projected post and at least one horizontal rib horizontally extended relative to the vertical axis; the horizontal rib being rearward projected beyond the lens and being correspondingly received in and engaged with the horizontal groove formed on the outer frame section; and the laterally projected post on the lens being correspondingly received in the recess or through hole formed on the outer frame section; and each of the lenses respectively having a bottom edge rest on the support section of the lower frame section.

10. The spectacle structure as claimed in claim 9, wherein there are two parallelly spaced grooves provided on and extended across the laterally outer side of each of the two outer frame sections, and the recess or through hole is located between the two grooves; and wherein there are two parallelly spaced horizontal ribs provided on the laterally inner side of each of the two lenses facing toward the outer frame section; and the two ribs being separately received in the two grooves.

11. The spectacle structure as claimed in claim 10, wherein the wear unit is pivotally connected to between the two ribs.

12. The spectacle structure as claimed in claim 11, wherein the two ribs are respectively provided at a rear end with a pivot hole.

13. The spectacle structure as claimed in claim 9, wherein the upper frame sections and the lower frame sections are respectively provided at predetermined positions with a plurality of venting slots extended from an inner side to an outer side of the upper and lower frame sections.

14. The spectacle structure as claimed in claim 9, further comprising a soft protective pad being attached to a rear side of the inner frame unit.

15. The spectacle structure as claimed in claim 9, wherein the wear unit includes two sets of connecting element and temple; each of the two connecting elements being pivotally connected at an end to one of the two opposite ends of the lens unit and connected at another opposite end to an end of a corresponding one of the two temples.

16. The spectacle structure as claimed in claim 9, wherein the wear unit includes two connecting elements and an elastic head strap; and each of the two connecting elements being pivotally connected at an end to one of two opposite ends of the lens unit and connected at another opposite end to one of two opposite ends of the head strap.

* * * * *